Aug. 18, 1931.  T. H. LESTER  1,819,902
AUTOMOBILE SIGNALING DEVICE
Filed March 18, 1931
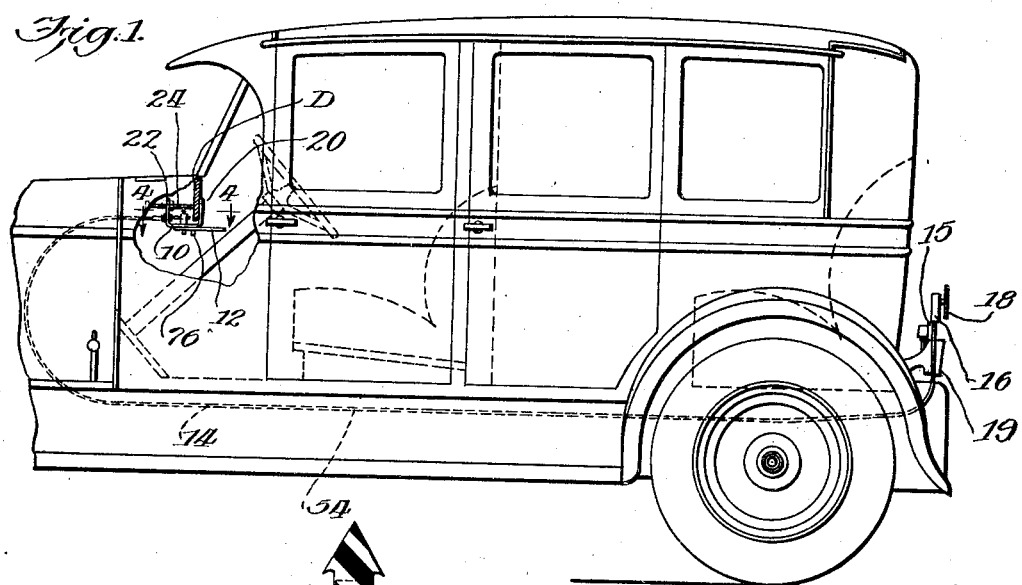
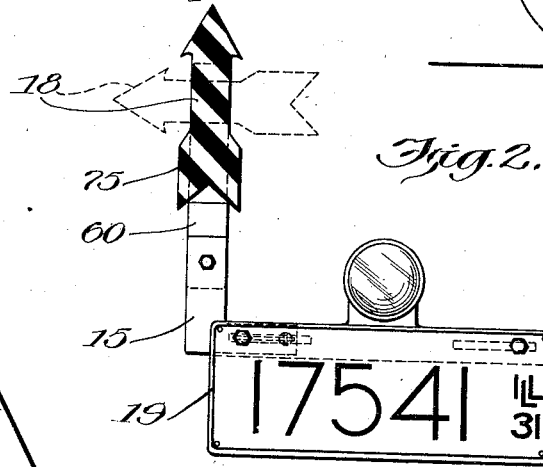
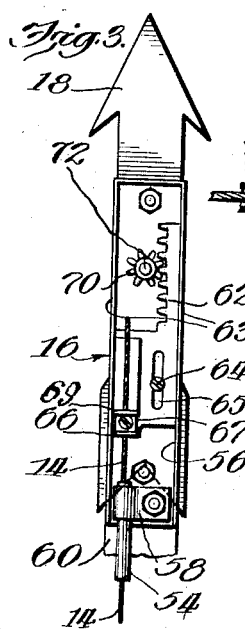
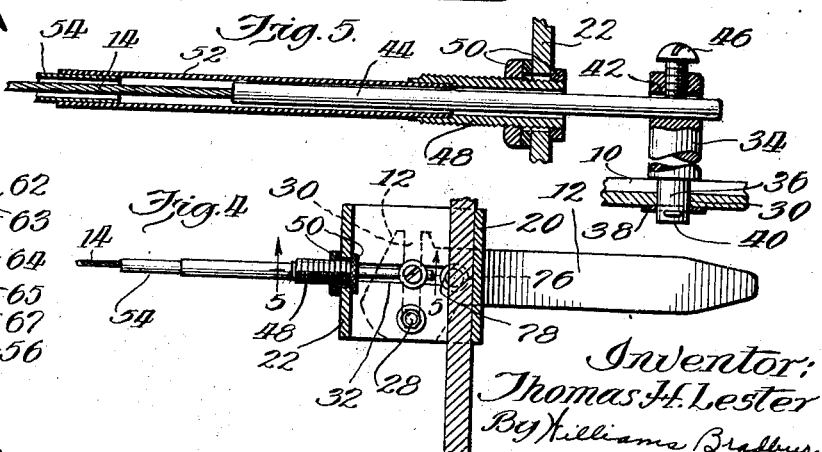
Inventor:
Thomas H. Lester Patented Aug. 18, 1931

1,819,902

UNITED STATES PATENT OFFICE

THOMAS H. LESTER, OF HIGHLAND PARK, ILLINOIS

AUTOMOBILE SIGNALING DEVICE

Application filed March 18, 1931. Serial No. 523,457.

My invention relates to signaling devices, and is more particularly concerned with the provision of an improved signaling device for use upon automotive vehicles.

An object of my invention is to provide an improved signaling device of this type that is capable of being operated by the driver of a vehicle to inform and signal to following drivers of vehicles when it is desired to turn to either the right or to the left.

A further object of my invention is to provide an improved signaling device of this type that may be attached to an automotive vehicle in the form of an accessory.

A further object of the present invention is to provide a signal supporting means capable of being mounted at the rear of the vehicle and being conveniently attachable to a carrier for a vehicle license.

Another object of my invention is to provide an improved form of attaching bracket for the operating handle, whereby the device may be easily and quickly mounted upon the dashboard of an automobile.

A further object of my invention is to provide a manually operated signaling device whereby directions of proposed travel may be signaled to following drivers at any desired time, such, for example, as a block or three-quarters of a block from the desired turn in order to give the following drivers ample time to govern themselves accordingly.

Still another object is the provision of a compact housing for the signal operating mechanism adapted to be conveniently attached to the rear license plate carrier.

Other objects and advantages lie in the specific structure and the cooperation of the elements, which will all be more clearly understood from the accompanying description, wherein reference is made to the accompanying sheet of drawings in which like numbers refer to like parts throughout the description.

In the drawings,

Fig. 1 is a side elevational view of an automobile upon which my improved signaling device is mounted, a portion of the body of the automobile being broken away in section to more clearly show the signaling device;

Fig. 2 is a front elevational view, looking from the rear of the automobile, of the signal operating housing mounted upon a bracket carried by the rear license plate carrier;

Fig. 3 is a rear elevational view of parts of the signal operating device;

Fig. 4 is a plan sectional view of the attaching bracket and operating lever taken on the line 4—4 of Fig. 1; and Fig. 5 is an enlarged fragmentary sectional view taken on the line 5—5 of Fig. 4.

In Fig. 1, I have shown my improved signaling device applied to an automobile of the usual type. The signaling device may comprise generally an attaching bracket 10, an operating lever 12, a flexible shaft 14 extending from the operating lever to the rear of the automobile to a mechanism housing 16, which carries a semaphore arm 18.

The bracket 10 may be U-shaped in form, having a pair of upright arms 20 and 22. Suitable bolts 24 are adapted to be screwthreadedly mounted in arm 22. These bolts bear against the dashboard D, clamping the same between the end of bolts 24 and arm 20. The operating lever 12 is pivotally mounted beneath the lower wall of bracket 10 upon a suitable pivot 28. The operating lever 12 is formed with an elongated slot 30 and the lower wall of bracket 10 is formed with a similar elongated slot 32 positioned in a transverse direction.

An upright post 34 which is connected to one end of the flexible shaft 14 is adapted to be positioned with a reduced stem 36 extending through both of said slots. The post is secured in this position by means of a washer 38 below lever 12 and a cotter pin 40. Post 34 has a transverse opening 42 therethrough near its upper end, through which the rigid portion 44 of the flexible shaft 14 is adapted to pass. The flexible cable is adapted to extend through opening 42 and be secured to post 34 by means of a set screw 46 positioned in the upper end of the post. The portion 44 extends through a sleeve-like member 48 that is fastened to the wall 22 of the bracket by means of lock nuts 50. Sleeve 48 has a reduced tubular extension 52 extending forward therefrom, in the end of which a shaft housing 54 is rigidly connected. This shaft housing is extended, as shown in Fig. 1, from the bracket 10 to the rear mechanism housing 16 where it is rigidly fastened in a compartment 56 by a clamping means 58. In this manner a rigid protecting means is provided for the flexible shaft 14 extending from the bracket 10 to the rear of the automobile.

The rear mechanism housing 16 may be carried by a bracket 15 extending upwardly from the license plate support 19. Housing 16 comprises a compartment 56 having an arm 60 formed integral therewith, which is bolted or otherwise secured to the upper end of bracket 15. A flat rack 62 is adapted to be mounted in compartment 56, guided between the vertical side walls 63 thereof, and further guided by a pin 64 which extends through an elongated slot 65 in the rack. The bar or plate rack has a pair of spaced offset ledges 66 which support a collar 67 therebetween. Collar 67 has an opening therein through which shaft 14 extends and a set screw 69 for securely attaching the collar to flexible shaft 14. By this arrangement, up and down movement of shaft 14 will carry rack 62 in the same direction, the extent of the movement being limited by the pin 64 and slot 65.

A pinion 70 is provided, meshing with rack 62 and mounted upon a shaft 72 which extends through a wall of compartment 56 and carries at its outer end the signal arm 18 which may be in the form of a direction arrow. Arm 18 may be marked with diagonal stripes 75, as shown, or colored in any desirable manner to contrast with the colors of the license plate, so that it may be easily distinguished therefrom.

The operation of the device will now be described. Upon moving lever 12 to the left, as shown in Fig. 4, the direction arrow 18 will be moved from a vertical position to the position shown in Fig. 2 through the medium of flexible shaft 14, rack 62 and pinion 72. In this manner drivers of following vehicles will be informed that the driver desires to make a left turn. In the same manner the driver may of course inform the following drivers when it is desired to make a right turn.

A cup-shaped support 76 is fastened to the bottom of operating lever 12, within which a spring-pressed ball 78 is mounted. This ball normally bears against the lower surface of bracket 10. However, when the operating lever is in the position shown in Fig. 4, the ball will extend upwardly into slot 32. The purpose of this spring-pressed ball is to provide a slight resistance to movement of the operating lever to the right or left, and also provide a means whereby the operator may ascertain without glancing at the lever whether or not the signal is in an upright or non-indicating position. It will also be noted that the signal arm is always turned in the direction lever 12 is moved. By this arrangement the driver may, by merely glancing at his lever, know exactly which direction the signal arm is indicating.

From the foregoing description, it will be apparent that a simple mechanism has been provided whereby the driver of an automobile can transmit his intentions of turning to following drivers. The manual operation of this device has a further attractive advantage in view of the fact that a driver can frequently give a warning of a desired left turn immediately after passing the corner of one block, and following drivers, aware of the signal, may swing around to the right of the automobile and proceed on their way, thereby expediting generally the movement of traffic.

While I have illustrated and described a specific embodiment of my invention, it will of course be understood that I do not desire to be limited to the specific details shown. Rather, what I desire to protect by Letters Patent of the United States is:

1. The combination of a signal arm, a shaft therefor, a pinion on said shaft, a flat rack bar meshing with said pinion, a pair of outwardly turned ledges on said rack bar, a collar supported therebetween, a flexible shaft, an operating lever, said flexible shaft extending from said operating lever to said collar, and means for fastening said shaft to said collar to reciprocate said rack.

2. A signaling device for an automobile comprising a signal arm carried at the rear of the automobile, mechanism for operating said arm associated therewith, a flexible shaft extending therefrom, an operating lever mounted adjacent the dashboard, said shaft being attached to said operating lever, a stud slidably mounted on said lever, said shaft being secured to said stud, and a bracket supporting said lever, said lever and said bracket having transverse intersecting slots therein and said stud extending upwardly through both of said slots whereby a straight line push and pull will be transmitted to said shaft from said lever.

3. A signaling device for an automobile comprising supporting means, an operating member mounted thereon, a signal arm, a shaft therefor, a pinion on said shaft, a flat rack bar, said pinion meshing with said flat rack bar, a pair of outwardly turned ledges on said rack bar, a collar supported therebetween, a flexible shaft extending from said operating member to said collar, and means for fastening said shaft to said collar.

4. A signaling device for an automobile comprising a signal arm, operating mechanism for said arm, including an operating lever, a flexible shaft extending therefrom to said mechanism, said shaft being operatively connected to said lever, a bracket spuporting said lever, said lever and said bracket being provided with transverse intersecting slots, and a stud extending through said slots for guidance thereby under actuation of said lever.

5. A signaling device for an automobile comprising a signal arm, operating mechanism for said arm, including an operating lever, a flexible shaft extending therefrom to said mechanism, said shaft being operatively connected to said lever, said member being provided with a guiding slot, and a stud engaging same, whereby said shaft will be guided under actuation of said lever.

6. A signaling device for an automobile comprising a signal arm, a mechanism housing, a shaft therefor extending through a wall of said mechanism housing, a pinion therein on said shaft, a flat rack bar, said pinion meshing with said flat rack bar, a pair of outwardly turned ledges on said rack bar, a collar supported therebetween, an operating member mounted adjacent the dashboard, and a flexible shaft extending from said collar to said operating member.

7. A signaling device for an automobile comprising a signal arm, a mechanism housing, a shaft therefor extending through a wall of said mechanism housing, a pinion therein on said shaft, a flat rack bar, said pinion meshing with said flat rack bar, a pair of outwardly turned ledges on said rack bar, a collar supported therebetween, an operating member mounted adjacent the dashboard, a flexible shaft extending from said collar to said operating member, and a connection between said flexible shaft and said operating member whereby left or right movement of said operating member will produce a similar movement of the signal arm.

8. A signaling device for an automobile comprising a signal arm carried at the rear of the automobile, mechanism for operating said arm associated therewith, a flexible shaft extending therefrom, an operating lever mounted adjacent the dashboard, said shaft being attached to said operating lever, a stud slidably mounted on said lever, said shaft being secured to said stud, and a bracket supporting said lever, said lever and said bracket having transverse intersecting slots therein and said stud extending upwardly through both of said slots whereby a straight line push and pull will be transmitted to said shaft from said lever, and movement of said lever to the left or right will produce corresponding movement of said signal arm.

9. A stop signal device for automobiles having a license plate carrier, said device comprising an operating member, a signaling device positioned at the rear of the automobile, mechanism for operating said device, said mechanism comprising a pinion and a rack, a flat rectangular housing adapted to supportably enclose said rack in such manner as to permit an up and down movement thereof said housing removably supported by the rear license plate carrier, and a flexible shaft conecting said mechanism and said operating lever.

10. A stop signal device for automobiles comprising an operating lever, a signaling arm positioned at the rear of the automobile, an operating mechanism for said arm, said mechanism comprising a rack and pinion, an elongated, rectangular housing for said operating mechanism, said housing being constructed to guidably support said rack on one of its inner faces, a flexible shaft connecting said mechanism and said operating lever, and a protective tube for said flexible shaft extending from said housing to said operating lever.

11. A stop signal device for automobiles comprising a bracket removably secured to the dash board of an automobile, an operating lever pivotally mounted thereon, a signaling arm positioned at the rear of the automobile, mechanism for operating said arm, said mechanism comprising a rack and pinion, a flat, elongated housing for said mechanism, said rack being slidably mounted upon one face of said housing, a flexible shaft connecting said mechanism and said operating lever, and a protective tube for said flexible shaft extending from said housing to said operating lever.

12. A stop signal device for automobiles comprising a bracket removably clamped to the dash board of an automobile, an operating lever pivotally mounted thereon, a signaling arm positioned at the rear of the automobile, mechanism for operating said arm, said mechanism comprising a pinion and a rack, a housing therefor, a flexible shaft connecting said mechanism and said operating lever being adapted to transmit a reversible motion, said flexible shaft associated therewith, and a protective tube for said flexible shaft extending from said housing to said operating lever, said tube fastened to said bracket at one end and to said housing at the other end.

13. A traffic signal device for automobiles having a rear license tag carrier, said device comprising a removable supporting bracket, an operating lever mounted thereon, a semaphore arm positioned at the rear of the automobile, mechanism for operating said arm comprising a rack and pinion, said rack having a slotted integral extension for mounting purposes, a housing for said mechanism designed to slidably support said rack on one of its inner faces, said housing being provided with supporting means adapted to engage the license tag carrier, said pinion having a shaft extending through a wall of said housing, said arm mounted on said shaft, and a flexible shaft connecting said mechanism and said operating lever.

In witness whereof, I hereunto subscribe my name this 11th day of March, 1931.

THOMAS H. LESTER.